(12) United States Patent
Clark et al.

(10) Patent No.: US 12,602,182 B2
(45) Date of Patent: *Apr. 14, 2026

(54) USER CONFIGURABLE SLC MEMORY SIZE

(71) Applicant: SK hynix NAND Product Solutions Corp., Rancho Cordova, CA (US)

(72) Inventors: Chace A. Clark, Hillsboro, OR (US); Francis Corrado, Redwood City, CA (US)

(73) Assignee: SK hynix NAND Product Solutions Corp., Rancho Cordova, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/807,445

(22) Filed: Aug. 16, 2024

(65) Prior Publication Data

US 2024/0402930 A1      Dec. 5, 2024

Related U.S. Application Data

(63) Continuation of application No. 17/231,893, filed on Apr. 15, 2021, now Pat. No. 12,093,547.

(51) Int. Cl.
G06F 3/06 (2006.01)

(52) U.S. Cl.
CPC ............ G06F 3/064 (2013.01); G06F 3/0605 (2013.01); G06F 3/0629 (2013.01); G06F 3/0659 (2013.01); G06F 3/0679 (2013.01)

(58) Field of Classification Search
None
See application file for complete search history.

(56) References Cited

U.S. PATENT DOCUMENTS

| | | | |
|---|---|---|---|
| 10,229,735 B1 | 3/2019 | Natarajan et al. | |
| 12,093,547 B2 * | 9/2024 | Clark .................... | G06F 3/0629 |
| 2008/0112238 A1 * | 5/2008 | Kim .................... | G11C 11/5621 |
| | | | 365/185.09 |
| 2016/0062660 A1 | 3/2016 | Kunimatsu et al. | |

(Continued)

FOREIGN PATENT DOCUMENTS

| | | |
|---|---|---|
| JP | 2015-215678 | 12/2015 |
| JP | 2015-228197 | 12/2015 |
| KR | 10-2015-0044264 | 8/2020 |

OTHER PUBLICATIONS

Decision for Grant dated May 13, 2025 in JP Patent Application No. 2023-562554, pp. 1-2.

(Continued)

*Primary Examiner* — Edward J Dudek, Jr.
*Assistant Examiner* — Ralph A Verderamo, III
(74) *Attorney, Agent, or Firm* — Byrne Poh LLP

(57) ABSTRACT

An embodiment of an electronic apparatus may include one or more substrates; and a controller coupled to the one or more substrates, the controller including logic to control access to a NAND-based storage media that includes a first cell region with a first number of levels and a second region with a second number of levels that is different from the first number of levels, determine logical block address locations that correspond to a user configurable capacity placeholder, and adjust respective sizes of the first cell region and the second cell region at runtime based on the logical block address locations. Other embodiments are disclosed and claimed.

20 Claims, 6 Drawing Sheets

(56) References Cited

U.S. PATENT DOCUMENTS

| | | | | |
|---|---|---|---|---|
| 2016/0062681 A1* | 3/2016 | Samuels | ............... | G06F 3/0634 |
| | | | | 711/103 |
| 2016/0085897 A1 | 3/2016 | Jeong | | |
| 2018/0081594 A1 | 3/2018 | Jung et al. | | |
| 2019/0043604 A1 | 2/2019 | Baca et al. | | |
| 2019/0056886 A1* | 2/2019 | Nagarajan | ............ | G06F 3/0659 |
| 2019/0332322 A1 | 10/2019 | Kwon et al. | | |
| 2020/0167089 A1* | 5/2020 | Natarajan | ............. | G11C 16/10 |
| 2021/0232313 A1 | 7/2021 | Clark et al. | | |

OTHER PUBLICATIONS

International Search Report and Written Opinion dated Aug. 3, 2022 in International Patent Application No. PCT/US2022/024865, pp. 1-7.
Notice of Allowance dated May 17, 2024 in U.S. Appl. No. 17/231,893, pp. 1-14.
Notice of Allowance dated Dec. 22, 2025 in KR Patent Application No. 10-2023-7039368, pp. 1-8.
Office Action dated May 13, 2025 in KR Patent Application No. 10-2023-7039368, pp. 1-3.

* cited by examiner

10

14

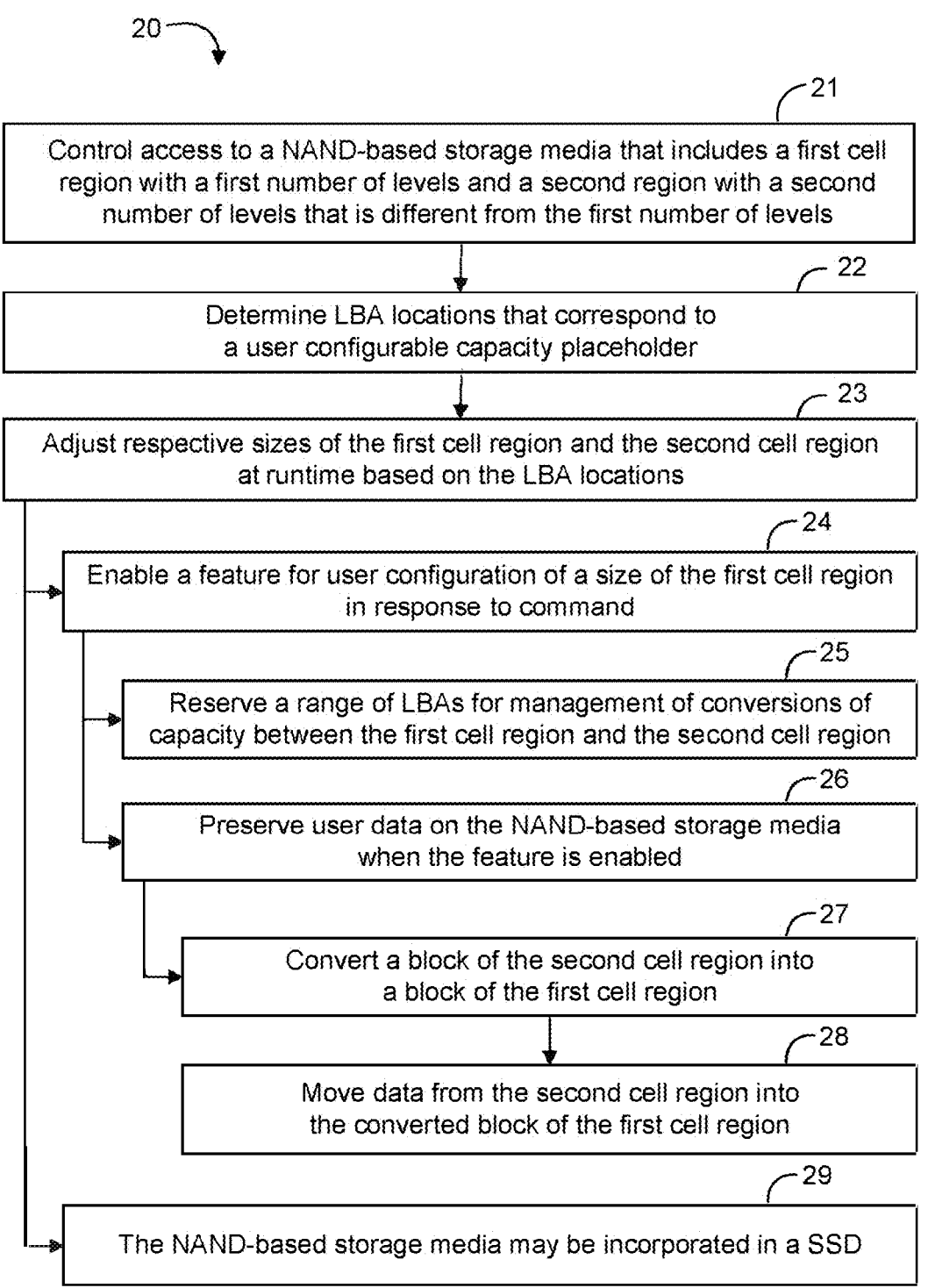

20

21

Control access to a NAND-based storage media that includes a first cell region with a first number of levels and a second region with a second number of levels that is different from the first number of levels

22

Determine LBA locations that correspond to a user configurable capacity placeholder

23

Adjust respective sizes of the first cell region and the second cell region at runtime based on the LBA locations

24

Enable a feature for user configuration of a size of the first cell region in response to command

25

Reserve a range of LBAs for management of conversions of capacity between the first cell region and the second cell region

26

Preserve user data on the NAND-based storage media when the feature is enabled

27

Convert a block of the second cell region into a block of the first cell region

28

Move data from the second cell region into the converted block of the first cell region

29

The NAND-based storage media may be incorporated in a SSD

FIG. 3

Processor 102-1

Core 1
106-1

L1
116-1

Core 2
106-2

· · ·

Core M
106-M

112

Router
110

Logic
170

Cache
108

104

Network
Interface
128

Network/
Cloud
129

Memory
Controller
120

Memory
114

Processor 102-2

Processor 102-3

Processor 102-N

Logic
170

SSD Cont.
Logic
125

Logic
160

SSD
130

Logic
160

USER CONFIGURABLE SLC MEMORY SIZE

CROSS-REFERENCE TO RELATED APPLICATION

This application is a continuation of U.S. patent application Ser. No. 17/231,893, filed Apr. 15, 2021, which is hereby incorporated by reference herein in its entirety.

BACKGROUND

Single-level cell (SLC) buffers may include NAND-type flash memory (NAND memory) that is organized into multiple cells, with each cell containing one bit of data. Tri-level cell (TLC) memory may include NAND memory that is organized into multiple cells, with each cell containing three bits of data. Quad-level cell (QLC) memory may include NAND memory that is organized into multiple cells, with each cell containing four bits of data. The number of bits per cell may generally depend on how many distinct voltage levels are used during program operation(s) associated with writing to, reading from and/or erasing the cell. Thus, in the case of TLC memory, to support three bits per cell, eight voltage levels may be used to distinguish between the eight possible combinations of ones and zeros (e.g., 000, 001, 010, 011, 100, 101, 110, 111) written to the cell.

Some storage systems include technology to determine a programmable eviction ratio associated with a storage device and convert a portion of a SLC region in the storage device into a multi-level cell (MLC) region in accordance with the programmable eviction ratio. MLC may include TLC (e.g., 3 bit or 8 level MLC), QLC (e.g., 4 bit or 16 level MLC), etc. For example, the amount of the portion converted into the MLC region varies gradually as a function of percent capacity filled in the storage device.

Some storage systems may include dynamic SLC memory controller technology. For example, the controller may determine an amount of valid data in a dynamic portion of the SLC region at runtime, and adjust a size of a dynamic portion of the SLC region at runtime based on the determined amount of valid data in the dynamic portion of the SLC region.

Some storage systems may include technology for multi-level memory repurposing. For example, a memory controller may re-provision a persistent storage media in response to a request to modify a configuration of the persistent storage media.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures:

FIG. 3 is a flowchart of an example of a method of controlling storage according to an embodiment;

DETAILED DESCRIPTION

Figure 1:
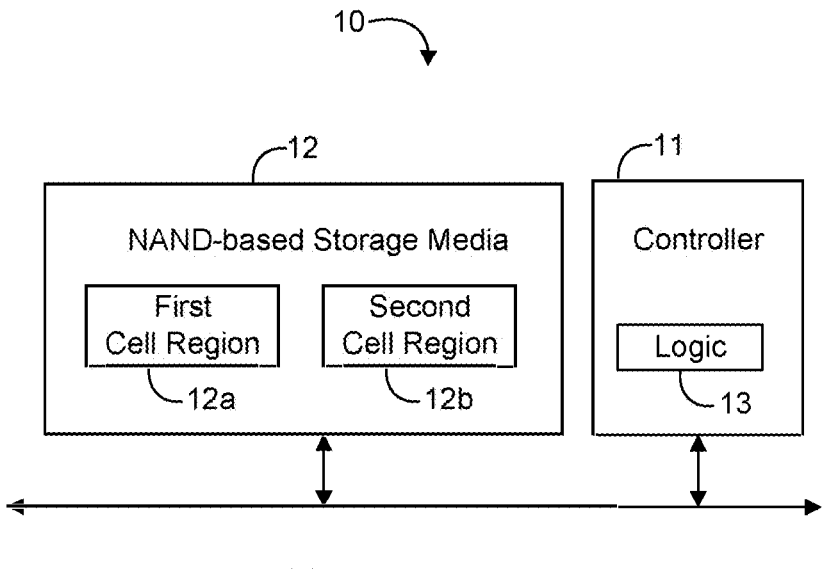
FIG. 1 is a block diagram of an example of an electronic storage system according to an embodiment.

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as set top boxes, smartphones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

References in the specification to "one implementation", "an implementation", "an example implementation", etc., indicate that the implementation described may include a particular feature, structure, or characteristic, but every embodiment may not necessarily include the particular feature, structure, or characteristic. Moreover, such phrases are not necessarily referring to the same implementation. Further, when a particular feature, structure, or characteristic is described in connection with an embodiment, it is submitted that it is within the knowledge of one skilled in the art to effect such feature, structure, or characteristic in connection with other implementations whether or not explicitly described herein.

Various embodiments described herein may include a memory component and/or an interface to a memory component. Such memory components may include volatile and/or nonvolatile (NV) memory. Volatile memory may be a storage medium that requires power to maintain the state of data stored by the medium. Non-limiting examples of volatile memory may include various types of RAM, such as dynamic RAM (DRAM) or static RAM (SRAM). One particular type of DRAM that may be used in a memory module is synchronous dynamic RAM (SDRAM). NV memory (NVM) may be a storage medium that does not require power to maintain the state of data stored by the medium. In one embodiment, the memory device may include a block addressable memory device, such as those based on NAND technologies. In one embodiment, the memory device may be or may include memory devices that use multi-threshold level NAND flash memory, or other memory. The memory device may refer to the die itself and/or to a packaged memory product.

With reference to FIG. 1, an embodiment of an electronic storage system 10 may include NAND-based storage media 12 that includes a first cell region 12*a* with a first number of levels and a second region 12*b* with a second number of levels that is different from the first number of levels, and a controller 11 communicatively coupled to the NAND-based storage media 12. The controller 11 may include logic 13 to determine logical block address (LBA) locations that correspond to a user configurable capacity placeholder, and adjust respective sizes of the first cell region 12*a* and the second cell region 12*b* at runtime based on the LBA locations. In some embodiments, the logic 13 may be further configured to enable a feature for user configuration of a size of the first cell region 12*a* in response to command. For example, the logic 13 may also be configured to reserve a range of LBAs for management of conversions of capacity between the first cell region 12*a* and the second cell region 12*b*.

In some embodiments, the logic 13 may be further configured to preserve user data on the NAND-based storage media 12 when the feature is enabled. For example, the logic 13 may be configured to convert a block of the second cell region 12*b* into a block of the first cell region 12*a*, and to move data from the second cell region 12*b* into the converted block of the first cell region 12*a*. In any of the embodiments herein, the controller 11 and the NAND-based storage media 12 may be incorporated in a solid-state drive (SSD).

Embodiments of each of the above controller 11, NAND-based storage media 12, logic 13, and other system components may be implemented in hardware, software, or any suitable combination thereof. For example, hardware implementations may include configurable logic such as, for example, programmable logic arrays (PLAs), field programmable gate arrays (FPGAs), complex programmable logic devices (CPLDs), or fixed-functionality logic hardware using circuit technology such as, for example, application specific integrated circuit (ASIC), complementary metal oxide semiconductor (CMOS) or transistor-transistor logic (TTL) technology, or any combination thereof. Embodiments of the controller 11 may include a general purpose controller, a special purpose controller, a memory controller, a storage controller, a micro-controller, a general purpose processor, a special purpose processor, a central processor unit (CPU), an execution unit, etc. In some embodiments, the NAND-based storage media 12, the logic 13, and/or other system memory may be located in, or co-located with, various components, including the controller 11 (e.g., on a same die).

Alternatively, or additionally, all or portions of these components may be implemented in one or more modules as a set of logic instructions stored in a machine- or computer-readable storage medium such as RAM, ROM, programmable ROM (PROM), firmware, flash memory, etc., to be executed by a processor or computing device. For example, computer program code to carry out the operations of the components may be written in any combination of one or more operating system (OS) applicable/appropriate programming languages, including an object-oriented programming language such as PYTHON, PERL, JAVA, SMALLTALK, C++, C# or the like and conventional procedural programming languages, such as the "C" programming language or similar programming languages. For example, the NAND-based storage media 12, other NAND-based storage media, or other system memory may store a set of instructions which when executed by the controller 11 cause the system 10 to implement one or more components, features, or aspects of the system 10 (e.g., the logic 13, determining the LBA locations that correspond to the user configurable capacity placeholder, adjusting the respective sizes of the first cell region 12*a* and the second cell region 12*b* at runtime based on the LBA locations, etc.).

Figure 2:
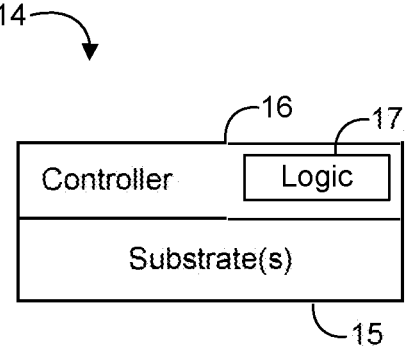
FIG. 2 is a block diagram of an example of an electronic apparatus according to an embodiment.

Turning now to FIG. 2, an embodiment of an electronic apparatus 14 may include one or more substrates 15, and a controller 16 coupled to the one or more substrates 15. The controller 16 may include logic 17 to control access to a NAND-based storage media that includes a first cell region with a first number of levels and a second region with a second number of levels that is different from the first number of levels, determine LBA locations that correspond to a user configurable capacity placeholder, and adjust respective sizes of the first cell region and the second cell region at runtime based on the LBA locations. In some embodiments, the logic 17 may be further configured to enable a feature for user configuration of a size of the first cell region in response to command. For example, the logic 17 may also be configured to reserve a range of LBAs for management of conversions of capacity between the first cell region and the second cell region.

In some embodiments, the logic 17 may be further configured to preserve user data on the NAND-based storage media when the feature is enabled. For example, the logic 17 may be configured to convert a block of the second cell region into a block of the first cell region, and to move data from the second cell region into the converted block of the first cell region. In any of the embodiments herein, the controller 16 and the NAND-based storage media may be incorporated in a SSD.

Embodiments of the logic 17 may be implemented in a system, apparatus, computer, device, etc., for example, such as those described herein. More particularly, hardware implementations of the logic 17 may include configurable logic such as, for example, PLAs, FPGAs, CPLDs, or in fixed-functionality logic hardware using circuit technology such as, for example, ASIC, CMOS, or TTL technology, or any combination thereof. Alternatively, or additionally, the logic 17 may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C# or the like and conventional procedural programming languages, such as the "C" programming language or similar programming languages.

For example, the logic 17 may be implemented on a semiconductor apparatus, which may include the one or more substrates 15, with the logic 17 coupled to the one or more substrates 15. In some embodiments, the logic 17 may be at least partly implemented in one or more of configurable logic and fixed-functionality hardware logic on semiconductor substrate(s) (e.g., silicon, sapphire, gallium-arsenide, etc.). For example, the logic 17 may include a transistor array and/or other integrated circuit components coupled to the substrate(s) 15 with transistor channel regions that are positioned within the substrate(s) 15. The interface between the logic 17 and the substrate(s) 15 may not be an abrupt junction. The logic 17 may also be considered to include an epitaxial layer that is grown on an initial wafer of the substrate(s) 15.

Turning now to FIG. 3, an embodiment of a method 20 of controlling storage may include controlling access to a NAND-based storage media that includes a first cell region with a first number of levels and a second region with a second number of levels that is different from the first number of levels at block 21, determining LBA locations that correspond to a user configurable capacity placeholder at block 22, and adjusting respective sizes of the first cell region and the second cell region at runtime based on the LBA locations at block 23. Some embodiments of the method 20 may further include enabling a feature for user configuration of a size of the first cell region in response to command at block 24. For example, the method 20 may include reserving a range of LBAs for management of conversions of capacity between the first cell region and the second cell region at block 25.

In some embodiments, the method 20 may further include preserving user data on the NAND-based storage media when the feature is enabled at block 26. For example, the method 20 may include converting a block of the second cell region into a block of the first cell region at block 27, and moving data from the second cell region into the converted block of the first cell region at block 28. In any of the embodiments herein, the NAND-based storage media may be incorporated in a SSD at block 29.

Embodiments of the method 20 may be implemented in a system, apparatus, computer, device, etc., for example, such as those described herein. More particularly, hardware implementations of the method 20 may include configurable logic such as, for example, PLAs, FPGAs, CPLDs, Course-Grained Reconfigurable Fabric (CGRA), or in fixed-functionality logic hardware using circuit technology such as, for example, ASIC, CMOS, or TTL technology, or any combination thereof. Alternatively, or additionally, the method 20 may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C# or the like and conventional procedural programming languages, such as the "C" programming language or similar programming languages.

For example, the method 20 may be implemented on a computer readable medium as described in connection with Examples 22 to 28 below. Embodiments or portions of the method 20 may be implemented in firmware, applications (e.g., through an application programming interface (API)), or driver software running on an operating system (OS). Additionally, logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

Some embodiments may advantageously provide technology for enabling user configuration of SLC buffer/cache sizes while preserving user data for NAND storage devices. Typically, when provisioning a NAND storage device with multiple bits per cell, a cache or buffer of SLC may be provisioned to improve the performance of the device. However, because each cell devoted to the SLC buffer only holds 1-bit, the overall capacity of the drive is reduced. Filesystems and partitioning systems rely upon the drive capacity to place some of their data structures. Because the overall capacity of the device is determined based on the size of the SLC buffer, the user cannot resize the amount of SLC according to their own needs without risking data loss and filesystem corruption. A user selection on a tradeoff between performance (e.g., SLC size) and overall capacity (e.g., QLC size, TLC size, etc.) may be made at the time of provisioning. To change the user-selected tradeoff, the drive's contents must be wiped.

Storage systems with a dynamic SLC buffer may adjust the size of the SLC buffer at runtime. But the adjustment is not user configurable. The user cannot select how the drive trades performance for capacity, and the user cannot guarantee a certain amount of SLC on the drive. Storage systems with multi-level memory repurposing technology (e.g., just-in-time block repurposing) may be able to reconfigure the storage media based on a user request, but generally involve taking the drive offline and changing the reported capacity of the drive, which interferes with operation of the filesystem. Advantageously, some embodiments provide technology to overcome one or more of the foregoing problems.

Some embodiments may utilize a host software component, such as a storage driver, to create a file on the storage device's filesystem. The created file will contain no data. After the LBA locations associated with the created file are communicated to the SSD's firmware, the SSD may increase the SSD's SLC buffers by the corresponding amount based upon the individual devices NAND erase block (EB) characteristics. For a SLC-QLC device, for example, the increase would correspond to a 4:1 ratio.

Advantageously, the user controls the configurability of the SLC. For example, if a user has a QLC based SSD and the user knows that their application will use less than one quarter (¼) of the capacity of the SSD, some embodiments enable the user to configure the storage system to be 100% SLC without losing the user data already on the drive. Later, should the user need more capacity, the user can undo this operation or provision the drive with another ratio as needed, again without losing or corrupting the data currently on the device.

The reclaimed SLC may be utilized for any useful storage need. For example, an application may utilize an embodiment to devote the SLC freed up to an intelligent caching solution (e.g., instead of as only a write buffer). Advantageously, a SSD device may ship with the capability to utilize its maximum capacity (e.g., with a corresponding favorable cost/gigabyte (GB) value). When deployed, the user may re-configure the tradeoff between performance and capacity as needed at runtime while preserving user data.

Some embodiments may utilize a host software driver and the filesystem to provide a mechanism to enable a user to make a seamless tradeoff between capacity and performance. For example, a desired tradeoff may be accomplished by the creation of a capacity placeholder or padding file to make specific SSD LBA ranges inaccessible to the rest of the system (e.g., the OS, other apps, etc.), and instead reserving them for firmware (FW) management of conversions between QLC and SLC capacity. For example, the user may select a tradeoff that increases the SLC capacity because SLC accesses deliver better performance than QLC.

In some embodiments, the padding file is created when a corresponding feature is enabled. For example, the LBA ranges may be passed to the SSD via a vendor unique command and then the padding file would be opened for reserved, exclusive access by some daemon service at every OS initialization. After the SSD FW receives the LBA ranges and determines how many new SLC blocks need to be created, the FW creates additional SLC by moving data out of current QLC blocks and into new SLC blocks as needed. The padding file would exist for as long as the corresponding feature is enabled.

Figure 4:
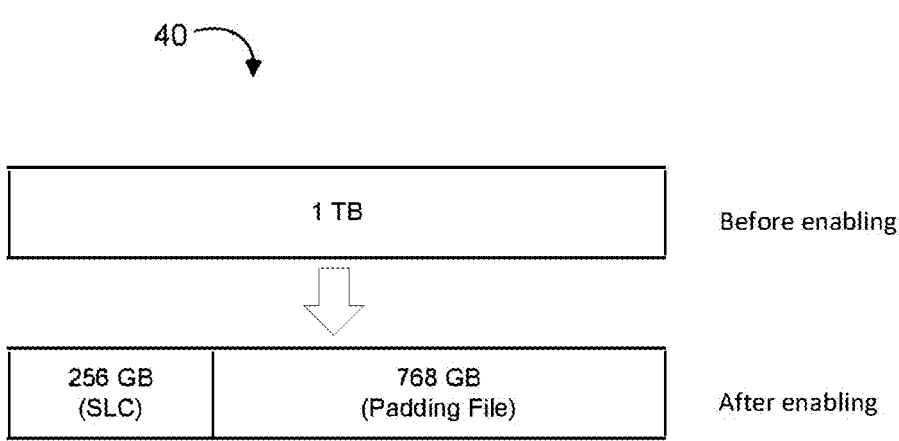
FIG. 4 is an illustrative diagram of an example of a process flow according to an embodiment.

With reference to FIG. 4, an embodiment of a process flow 40 shows how a 1 terabyte (TB) drive may be reconfigured by a user. Before enabling the feature for user configuration of the SLC capacity, the entire 1 TB of the drive may be available to the OS and filesystem. After the user enables the feature and requests maximum SLC capacity, 100% of the drive is converted to SLC storage. For a QLC drive, this results in 256 GB of SLC capacity (e.g., a 4:1 reduction in capacity from the 1024 GB of the drive converted from QLC to SLC) with much better read and write access performance. A 768 GB padding file is created as a capacity placeholder to account for the remainder of the original 1 TB. Advantageously, the padding file makes the drive appear as though the SSD remains unchanged to the OS and filesystem. Even though the drive has been reconfigured, no hardware re-provisioning is needed to account for the physical change in capacity and the system may continue to operate normally.

Figure 5:
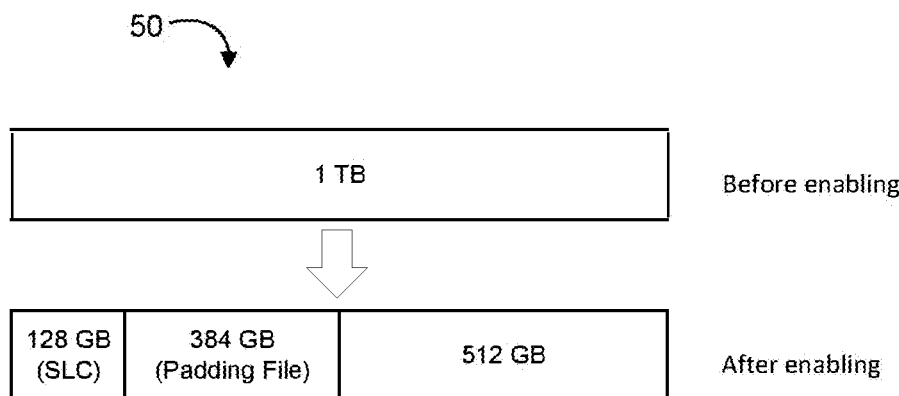
FIG. 5 is an illustrative diagram of another example of a process flow according to an embodiment.

With reference to FIG. 5, an embodiment of a process flow 50 shows another example of how a 1 TB drive may be reconfigured by a user. Before enabling the feature for user configuration of the SLC capacity, the entire 1 TB of the drive may be available to the OS and filesystem. After the user enables the feature and requests 50% SLC capacity, 50% of the drive is converted to SLC storage. For a QLC drive, this results in 128 GB of SLC capacity (e.g., a 4:1 reduction in capacity from the 512 GB of the drive converted from QLC to SLC) with much better read and write access performance. A 384 GB padding file is created as a capacity placeholder to account for the remainder of the original 512 GB converted to SLC. Advantageously, the padding file makes the drive appear as though the SSD remains unchanged to the OS and filesystem. Even though the drive has been reconfigured, no hardware re-provisioning is needed to account for the physical change in capacity and the system may continue to operate normally.

In some embodiments, the actual breakdown of the ratio specified may be set by the user in a graphical user interface (GUI). For example, the interface may query the specific NAND cell characteristics of the drive. The interface may also determine the capacity tradeoffs and communicate those to the user. As illustrated in FIGS. 4 and 5, for a QLC SSD the feature would need to reserve 4-bits for every bit of SLC reclaimed. For NAND SSDs that support modes in addition to SLC and QLC, embodiments of the feature may be configured to convert between other supported modes (e.g., two-level cells (MLC), TLC, etc.).

Figure 6:
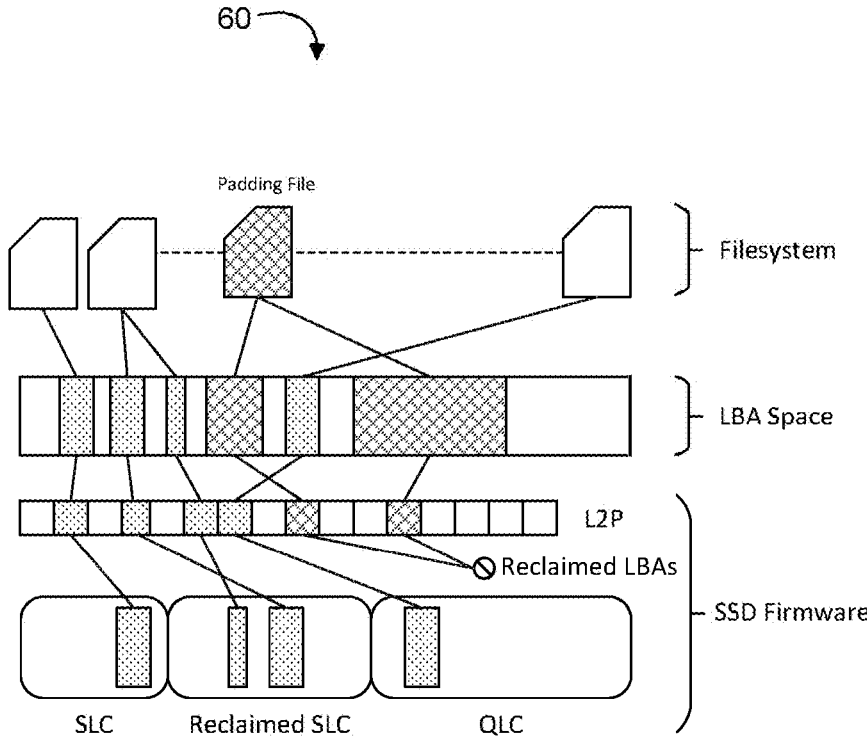
FIG. 6 is a block diagram of an example of a storage system according to an embodiment.

With reference to FIG. 6, an embodiment of a storage system 60 may include a filesystem with a plurality of files. The filesystem creates files that translate to LBA locations. The LBA locations are then translated by SSD FW using a logical to physical (L2P) table into NAND cell locations. The SSD may contain some amount of SLC that is utilized as a buffer/cache by the SSD FW. In some embodiments, when the feature for user configuration is enabled, the SSD FW creates locations in the L2P that don't map to physical NAND locations (e.g., identified as reclaimed LBAs in FIG. 6). Because those locations are allocated to the padding file, the SSD FW knows those locations cannot map to valid data. Accordingly, the SSD FW may create more SLC (e.g., identified as reclaimed SLC in FIG. 6) to improve the performance of the storage device. For example, if the SSD has enough QLC blocks for 1 TB, but 512 GB of that space is reserved when the user enables the feature for user configuration, the SSD FW can safely use that 512 GB worth of QLC capacity for 128 GB of SLC blocks. Because embodiments utilize the SSD's L2P indirection table to mark the locations associated with the padding file, fragmentation of the padding file is not an issue.

In some embodiments, where a padding file is utilized as a capacity placeholder to reserve space in this way, there is some risk that the LBA locations assigned to the padding file will be changed. In some embodiments, a change to the LBA locations assigned to the padding may be detected by the SSD FW itself via a failsafe option to automatically roll back the feature. In some embodiments, the failsafe option refers to detection of a write occurring to reserved LBAs and then correction of SLC being mapped back to QLC. If the SSD FW ever receives a write (e.g., or TRIM) request to any LBA within the reserved LBA range, the SSD FW may immediately cancel the feature internally (e.g., disable the feature for user configuration), convert any valid SLC data in the range to QLC, and revert to a NAND configuration without any reclaimed SLC (e.g., the configuration prior to when the user enabled the feature, or the original configuration). Note that reads can safely be issued to the padding file on the host system, because the SSD can return zeros (e.g., similar to what the SSD does when reading trimmed locations).

For example, a write request to an LBA within the reserved range might occur if the filesystem were mounted as a data drive on an OS that was not aware of this feature and erased or overwrote those LBAs that had been previously reserved with FW. Filesystem corruption is an additional possible trigger for the failsafe option. The process of reverting the feature may trigger to the SSD's NAND garbage collection process to convert the SLC back to QLC, resulting in a temporary performance drop, but no data loss. For example, the conversion process may be performed by utilizing appropriate operation codes (e.g., OP codes) or feature set that can put the entire NAND die in the desired mode (e.g., SLC. MLC, TLC, QLC, etc.). The SSD FW identifies the target block and target mode. The SSD FW first converts the NAND die to the target mode and the issues a specific operation (e.g., erase, program or read) to the target block. The conversion process may be performed for every targeted block and the SSD FW maintains the target mode for every targeted block.

In addition to enabling and disabling the feature for user configuration, the associated host software may be responsible for minimizing situations that trigger the failsafe option, and to recover from the failsafe option when the failsafe option occurs. To facilitate this, the padding file should be assigned the most restrictive filesystem access properties to eliminate most problematic programs and users from triggering the failsafe option. Host filesystem features, such as filesystem compression, that may potentially interfere with the feature for user configuration should be disabled, and problematic operations such as writes, moves, file creation or file deletion should be intercepted and handled by appropriate host filesystem filters.

For the system to function properly, the LBA locations of the padding file in the filesystem must match those specified as reclaimed in the SSD firmware L2P. To ensure this, on power on, the host software manually requests this information from the SSD and checks for any differences. If the SSD FW ever detects a mismatch, the SSD FW notifies the host driver.

Upon notification of a mismatch, the host driver can either disable the feature entirely or attempt to correct the mismatch. Correcting the mismatch is only possible if there is still enough unused capacity to create the desired size of the padding file. For example, if the user deleted the 512 GB padding file on a system without the feature's protective host SW, then filled up the SSD leaving less than 512 GB free, the 512 GB padding file can no longer be created. In this case, the feature is simply disabled.

A pre-OS or unified extensible firmware interface (UEFI) driver component is not needed for some embodiments because there is no need to access the padding file before the OS is up and running (e.g., host SW components for the feature for user configuration will not be needed until OS initialization).

In an alternate embodiment, a separate padding partition may be used as a capacity placeholder for the reclaimed portion of the SSD's capacity instead of a padding file. The use of a padding partition as a capacity placeholder may be similar to the use of a padding file, except when a user wants to consume capacity to create more SLC. In this situation, the original data partition may have its files spread out across the larger LBA space and there may not be enough free space at the beginning or end of the partition to shrink the data partition enough. For certain files, e.g., the paging file, the files may not even be movable during runtime. Therefore, an "offline" environment such as the UEFI may be needed to move these kinds of protected files. In either embodiment, the data layout of the SSD's LBA space is used to set aside locations that are known to be unused and unmapped so that the SSD can allocate more of the faster SLC as configured by the user.

The technology discussed herein may be provided in various computing systems (e.g., including a non-mobile computing device such as a desktop, workstation, server, rack system, etc., a mobile computing device such as a smartphone, tablet, Ultra-Mobile Personal Computer (UMPC), laptop computer, ULTRABOOK computing device, smart watch, smart glasses, smart bracelet, etc., and/or a client/edge device such as an Internet-of-Things (IoT) device (e.g., a sensor, a camera, etc.)).

Figure 7:
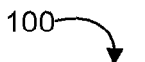
FIG. 7 is a block diagram of another example of a computing system according to an embodiment.

Turning now to FIG. 7, an embodiment of a computing system 100 may include one or more processors 102-1 through 102-N (generally referred to herein as "processors 102" or "processor 102"). The processors 102 may communicate via an interconnection or bus 104. Each processor 102 may include various components some of which are only discussed with reference to processor 102-1 for clarity. Accordingly, each of the remaining processors 102-2 through 102-N may include the same or similar components discussed with reference to the processor 102-1.

In some embodiments, the processor 102-1 may include one or more processor cores 106-1 through 106-M (referred to herein as "cores 106," or more generally as "core 106"), a cache 108 (which may be a shared cache or a private cache in various embodiments), and/or a router 110. The processor cores 106 may be implemented on a single integrated circuit (IC) chip. Moreover, the chip may include one or more shared and/or private caches (such as cache 108), buses or interconnections (such as a bus or interconnection 112), logic 170, memory controllers, or other components.

In some embodiments, the router 110 may be used to communicate between various components of the processor 102-1 and/or system 100. Moreover, the processor 102-1 may include more than one router 110. Furthermore, the multitude of routers 110 may be in communication to enable data routing between various components inside or outside of the processor 102-1.

The cache 108 may store data (e.g., including instructions) that is utilized by one or more components of the processor 102-1, such as the cores 106. For example, the cache 108 may locally cache data stored in a memory 114 for faster access by the components of the processor 102. As shown in FIG. 7, the memory 114 may be in communication with the processors 102 via the interconnection 104. In some embodiments, the cache 108 (that may be shared) may have various levels, for example, the cache 108 may be a mid-level cache and/or a last-level cache (LLC). Also, each of the cores 106 may include a level 1 (L1) cache (116-1) (generally referred to herein as "L1 cache 116"). Various components of the processor 102-1 may communicate with the cache 108 directly, through a bus (e.g., the bus 112), and/or a memory controller or hub.

As shown in FIG. 7, memory 114 may be coupled to other components of system 100 through a memory controller 120. Memory 114 may include volatile memory and may be interchangeably referred to as main memory or system memory. Even though the memory controller 120 is shown to be coupled between the interconnection 104 and the memory 114, the memory controller 120 may be located elsewhere in system 100. For example, memory controller 120 or portions of it may be provided within one of the processors 102 in some embodiments.

The system 100 may communicate with other devices/systems/networks via a network interface 128 (e.g., which is in communication with a computer network and/or the cloud 129 via a wired or wireless interface). For example, the network interface 128 may include an antenna (not shown) to wirelessly (e.g., via an Institute of Electrical and Electronics Engineers (IEEE) 802.11 interface (including IEEE 802.11a/b/g/n/ac, etc.), cellular interface, 3G, 4G, LTE, BLUETOOTH, etc.) communicate with the network/cloud 129.

System 100 may also include a storage device such as a SSD 130 coupled to the interconnect 104 via SSD controller logic 125. Hence, logic 125 may control access by various components of system 100 to the SSD 130. Furthermore, even though logic 125 is shown to be directly coupled to the interconnection 104 in FIG. 7, logic 125 can alternatively communicate via a storage bus/interconnect (such as the SATA (Serial Advanced Technology Attachment) bus, Peripheral Component Interconnect (PCI) (or PCI EXPRESS (PCIe) interface), NVM EXPRESS (NVMe), etc.) with one or more other components of system 100 (for example where the storage bus is coupled to interconnect 104 via some other logic like a bus bridge, chipset, etc.) Additionally, logic 125 may be incorporated into memory controller logic (such as those discussed with reference to FIG. 8) or provided on a same integrated circuit (IC) device in various embodiments (e.g., on the same circuit board device as the SSD 130 or in the same enclosure as the SSD 130).

Furthermore, logic 125 and/or SSD 130 may be coupled to one or more sensors (not shown) to receive information (e.g., in the form of one or more bits or signals) to indicate the status of or values detected by the one or more sensors. These sensor(s) may be provided proximate to components of system 100 (or other computing systems discussed herein), including the cores 106, interconnections 104 or 112, components outside of the processor 102, SSD 130, SSD bus, SATA bus, logic 125, logic 160, logic 170, etc., to sense variations in various factors affecting power/thermal behavior of the system/platform, such as temperature, operating frequency, operating voltage, power consumption, and/or inter-core communication activity, etc.

Figure 8:
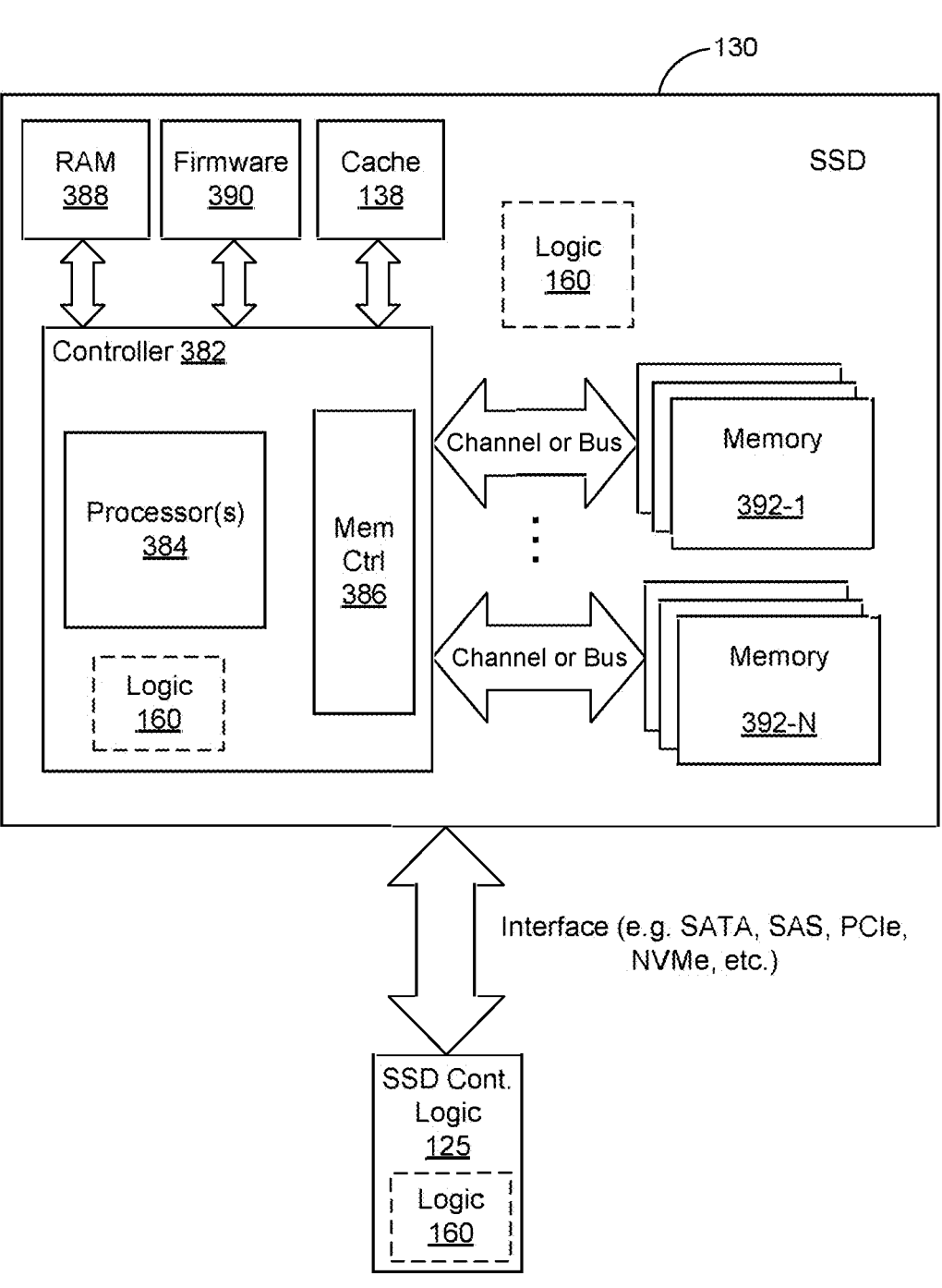
FIG. 8 is a block diagram of an example of a solid-state drive (SSD) device according to an embodiment.

FIG. 8 illustrates a block diagram of various components of the SSD 130, according to an embodiment. As illustrated in FIG. 8, logic 160 may be located in various locations such as inside the SSD 130 or controller 382, etc., and may include similar technology as discussed in connection with FIG. 7. The SSD 130 includes a controller 382 (which in turn includes one or more processor cores or processors 384 and memory controller logic 386), cache 138, RAM 388, firmware storage 390, and one or more memory devices 392-1 to 392-N (collectively memory 392, which may include NAND media, or other types of non-volatile memory). The memory 392 is coupled to the memory controller logic 386 via one or more memory channels or busses. Also, SSD 130 communicates with logic 125 via an interface (such as a SATA, SAS, PCIe, NVMe, etc., interface). Processors 384 and/or controller 382 may compress/decompress data written to or read from memory devices 392-1 to 392-N.

As illustrated in FIGS. 7 and 8, the SSD 130 may include logic 160, which may be in the same enclosure as the SSD 130 and/or fully integrated on a printed circuit board (PCB) of the SSD 130. The system 100 may include further logic 170 outside of the SSD 130. One or more of the features/aspects/operations discussed with reference to FIGS. 1-6 may be performed by one or more of the components of FIGS. 7 and/or 8. Also, one or more of the features/aspects/operations of FIGS. 1-6 may be programmed into the firmware 390. Further, SSD controller logic 125 may also include logic 160. Advantageously, the logic 160 and/or the logic 170 may include technology to implement one or more aspects of the system 10 (FIG. 1), the apparatus 14 (FIG. 2), the method 20 (FIG. 3), the process flow 40 (FIG. 4), the process flow 50 (FIG. 5), the storage system 60 (FIG. 6), and/or any of the features discussed herein. For example, the logic 170 may include technology to implement the host device/computer system/agent aspects of the various embodiments described herein while the logic 160 may include technology to implement the storage device aspects of the various embodiments described herein.

For example, the memory 392 may include NAND-based storage media that includes a first cell region with a first number of levels (e.g., SLC) and a second region with a second number of levels (e.g., QLC) that is different from the first number of levels. The logic 160 in the controller 382 may be configured to determine LBA locations that correspond to a user configurable capacity placeholder (e.g., a padding file, a padding partition, etc.), and adjust respective sizes of the first cell region and the second cell region at runtime based on the LBA locations. In some embodiments, the logic 160 may be further configured to enable a feature for user configuration of a size of the first cell region in response to command (e.g., a vendor unique command). For example, the logic 160 may also be configured to reserve a range of LBAs for management of conversions of capacity between the first cell region and the second cell region.

In some embodiments, the logic 160 may be further configured to preserve user data on the memory 392 when the feature is enabled. For example, the logic 160 may be configured to convert a block of the second cell region into a block of the first cell region, and to move data from the second cell region into the converted block of the first cell region.

In other embodiments, the SSD 130 may be replaced with any suitable storage/memory technology/media. In some embodiments, the logic 160/170 may be coupled to one or more substrates (e.g., silicon, sapphire, gallium arsenide, printed circuit board (PCB), etc.), and may include transistor channel regions that are positioned within the one or more substrates. In other embodiments, the SSD 130 may include two or more types of storage media. For example, the bulk of the storage may be NAND and may further include some faster, smaller granularity accessible (e.g., byte-addressable) NVM. The SSD 130 may alternatively, or additionally, include persistent volatile memory (e.g., battery or capacitor backed-up DRAM or SRAM). For example, the SSD 130 may include POWER LOSS IMMINENT (PLI) technology with energy storing capacitors. The energy storing capacitors may provide enough energy (power) to complete any commands in progress and to make sure that any data in the DRAMs/SRAMs is committed to the non-volatile NAND media. The capacitors may act as backup batteries for the persistent volatile memory. As shown in FIGS. 7 and 8, features or aspects of the logic 160 and/or the logic 170 may be distributed throughout the system 100, and/or co-located/integrated with various components of the system 100.

Additional Notes and Examples

Example 1 includes an electronic apparatus, comprising one or more substrates, and a controller coupled to the one or more substrates, the controller including logic to control access to a NAND-based storage media that includes a first cell region with a first number of levels and a second region with a second number of levels that is different from the first number of levels, determine logical block address locations that correspond to a user configurable capacity placeholder, and adjust respective sizes of the first cell region and the second cell region at runtime based on the logical block address locations.

Example 2 includes the apparatus of Example 1, wherein the logic is further to enable a feature for user configuration of a size of the first cell region in response to command.

Example 3 includes the apparatus of Example 2, wherein the logic is further to reserve a range of logical block addresses for management of conversions of capacity between the first cell region and the second cell region.

Example 4 includes the apparatus of any of Examples 2 to 3, wherein the logic is further to preserve user data on the NAND-based storage media when the feature is enabled.

Example 5 includes the apparatus of Example 4, wherein the logic is further to convert a block of the second cell region into a block of the first cell region.

Example 6 includes the apparatus of Example 5, wherein the logic is further to move data from the second cell region into the converted block of the first cell region.

Example 7 includes the apparatus of any of Examples 1 to 6, wherein the controller and the NAND-based storage media are incorporated in a solid-state drive.

Example 8 includes an electronic storage system, comprising NAND-based storage media that includes a first cell region with a first number of levels and a second region with a second number of levels that is different from the first number of levels, and a controller communicatively coupled to the NAND-based storage media, the controller including logic to determine logical block address locations that correspond to a user configurable capacity placeholder, and adjust respective sizes of the first cell region and the second cell region at runtime based on the logical block address locations.

Example 9 includes the system of Example 8, wherein the logic is further to enable a feature for user configuration of a size of the first cell region in response to command.

Example 10 includes the system of Example 9, wherein the logic is further to reserve a range of logical block addresses for management of conversions of capacity between the first cell region and the second cell region.

Example 11 includes the system of any of Examples 9 to 10, wherein the logic is further to preserve user data on the NAND-based storage media when the feature is enabled.

Example 12 includes the system of Example 11, wherein the logic is further to convert a block of the second cell region into a block of the first cell region.

Example 13 includes the system of Example 12, wherein the logic is further to move data from the second cell region into the converted block of the first cell region.

Example 14 includes the system of any of Examples 8 to 13, wherein the controller and the NAND-based storage media are incorporated in a solid-state drive.

Example 15 includes a method of controlling storage, comprising controlling access to a NAND-based storage media that includes a first cell region with a first number of levels and a second region with a second number of levels that is different from the first number of levels, determining logical block address locations that correspond to a user configurable capacity placeholder, and adjusting respective sizes of the first cell region and the second cell region at runtime based on the logical block address locations.

Example 16 includes the method of Example 15, further comprising enabling a feature for user configuration of a size of the first cell region in response to command.

Example 17 includes the method of Example 16, further comprising reserving a range of logical block addresses for management of conversions of capacity between the first cell region and the second cell region.

Example 18 includes the method of any of Examples 16 to 17, further comprising preserving user data on the NAND-based storage media when the feature is enabled.

Example 19 includes the method of Example 18, further comprising converting a block of the second cell region into a block of the first cell region.

Example 20 includes the method of Example 19, further comprising moving data from the second cell region into the converted block of the first cell region.

Example 21 includes the method of any of Examples 15 to 20, wherein the NAND-based storage media is incorporated in a solid-state drive.

Example 22 includes at least one non-transitory machine readable medium comprising a plurality of instructions that, in response to being executed on a computing device, cause the computing device to control access to a NAND-based storage media that includes a first cell region with a first number of levels and a second region with a second number of levels that is different from the first number of levels, determine logical block address locations that correspond to a user configurable capacity placeholder, and adjust respective sizes of the first cell region and the second cell region at runtime based on the logical block address locations.

Example 23 includes the at least one non-transitory machine readable medium of Example 22, comprising a plurality of further instructions that, in response to being executed on the computing device, cause the computing device to enable a feature for user configuration of a size of the first cell region in response to command.

Example 24 includes the at least one non-transitory machine readable medium of Example 23, comprising a plurality of further instructions that, in response to being executed on the computing device, cause the computing device to reserve a range of logical block addresses for management of conversions of capacity between the first cell region and the second cell region.

Example 25 includes the at least one non-transitory machine readable medium of any of Examples 23 to 24, comprising a plurality of further instructions that, in response to being executed on the computing device, cause the computing device to preserve user data on the NAND-based storage media when the feature is enabled.

Example 26 includes the at least one non-transitory machine readable medium of Example 25, comprising a plurality of further instructions that, in response to being executed on the computing device, cause the computing device to convert a block of the second cell region into a block of the first cell region.

Example 27 includes the at least one non-transitory machine readable medium of Example 26, comprising a plurality of further instructions that, in response to being executed on the computing device, cause the computing device to move data from the second cell region into the converted block of the first cell region.

Example 28 includes the at least one non-transitory machine readable medium of any of Examples 22 to 27, wherein the NAND-based storage media is incorporated in a solid-state drive.

Example 29 includes a storage controller apparatus, comprising means for controlling access to a NAND-based storage media that includes a first cell region with a first number of levels and a second region with a second number of levels that is different from the first number of levels, means for determining logical block address locations that correspond to a user configurable capacity placeholder, and means for adjusting respective sizes of the first cell region and the second cell region at runtime based on the logical block address locations.

Example 30 includes the apparatus of Example 29, further comprising means for enabling a feature for user configuration of a size of the first cell region in response to command.

Example 31 includes the apparatus of Example 30, further comprising means for reserving a range of logical block addresses for management of conversions of capacity between the first cell region and the second cell region.

Example 32 includes the apparatus of any of Examples 30 to 31, further comprising means for preserving user data on the NAND-based storage media when the feature is enabled.

Example 33 includes the apparatus of Example 32, further comprising means for converting a block of the second cell region into a block of the first cell region.

Example 34 includes the apparatus of Example 33, further comprising means for moving data from the second cell region into the converted block of the first cell region.

Example 35 includes the apparatus of any of Examples 29 to 34, wherein the NAND-based storage media is incorporated in a solid-state drive.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrase "one or more of A, B, and C" and the phrase "one or more of A, B, or C" both may mean A; B; C; A and B; A and C; B and C; or A, B and C. Various components of the systems described herein may be implemented in software, firmware, and/or hardware and/or any combination thereof. For example, various components of the systems or devices discussed herein may be provided, at least in part, by hardware of a computing SoC such as may be found in a computing system such as, for example, a smart phone. Those skilled in the art may recognize that systems described herein may include additional components that have not been depicted in the corresponding figures. For example, the systems discussed herein may include additional components such as bit stream multiplexer or de-multiplexer modules and the like that have not been depicted in the interest of clarity.

While implementation of the example processes discussed herein may include the undertaking of all operations shown in the order illustrated, the present disclosure is not limited in this regard and, in various examples, implementation of the example processes herein may include only a subset of the operations shown, operations performed in a different order than illustrated, or additional operations.

In addition, any one or more of the operations discussed herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more graphics processing unit(s) or processor core(s) may undertake one or more of the blocks of the example processes herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of the operations discussed herein and/or any portions the devices, systems, or any module or component as discussed herein.

As used in any implementation described herein, the term "module" refers to any combination of software logic, firmware logic, hardware logic, and/or circuitry configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, fixed function circuitry, execution unit circuitry, and/or firmware that stores instructions executed by programmable circuitry. The modules may, collectively or individually, be embodied as circuitry that forms part of a larger system, for example, an integrated circuit (IC), system on-chip (SoC), and so forth.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as IP cores may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

It will be recognized that the embodiments are not limited to the embodiments so described, but can be practiced with modification and alteration without departing from the scope of the appended claims. For example, the above embodiments may include specific combination of features. However, the above embodiments are not limited in this regard and, in various implementations, the above embodiments may include the undertaking only a subset of such features, undertaking a different order of such features, undertaking a different combination of such features, and/or undertaking additional features than those features explicitly listed. The scope of the embodiments should, therefore, be determined with reference to the appended claims, along with the full scope of equivalents to which such claims are entitled.

What is claimed is:

1. An electronic apparatus, comprising:
   NAND-based storage media that includes a first cell region with a first number of levels and a second cell region with a second number of levels that is different from the first number of levels; and a controller coupled to the NAND-based storage media, wherein the controller is configured to at least:

determine logical block address locations that correspond to a capacity placeholder, and adjust respective sizes of the first cell region and the second cell region based on the logical block address locations.

2. The apparatus of claim 1, wherein the controller is further configured to:

enable a feature for user configuration of a size of the first cell region in response to a command.

3. The apparatus of claim 2, wherein the controller is further configured to:

reserve a range of logical block addresses for management of conversions of capacity between the first cell region and the second cell region.

4. The apparatus of claim 2, wherein the controller is further configured to:

preserve user data on the NAND-based storage media when the feature is enabled.

5. The apparatus of claim 4, wherein the controller is further configured to:

convert a block of the second cell region into a converted block of the first cell region.

6. The apparatus of claim 5, wherein the controller is further configured to:

move data from the second cell region into the converted block of the first cell region.

7. The apparatus of claim 1, wherein the controller and the NAND-based storage media are incorporated in a solid-state drive.

8. An electronic storage system, comprising:

non-volatile storage media that includes a first cell region with a first number of levels and a second cell region with a second number of levels that is different from the first number of levels; and a controller coupled to the non-volatile storage media, wherein the controller is configured to at least:

determine logical block address locations that correspond to a capacity placeholder, and adjust respective sizes of the first cell region and the second cell region based on the logical block address locations.

9. The system of claim 8, wherein the controller is further configured to:

enable a feature for user configuration of a size of the first cell region in response to a command.

10. The system of claim 9, wherein the controller is further configured to:

reserve a range of logical block addresses for management of conversions of capacity between the first cell region and the second cell region.

11. The system of claim 9, wherein the controller is further configured to:

preserve user data on the non-volatile storage media when the feature is enabled.

12. The system of claim 11, wherein the controller is further configured to:

convert a block of the second cell region into a block of the first cell region.

13. The system of claim 12, wherein the controller is further configured to:

move data from the second cell region into the converted block of the first cell region.

14. The system of claim 8, wherein the controller and the non-volatile storage media are incorporated in a solid-state drive.

15. A method of controlling storage, comprising:

determining logical block address locations that correspond to a capacity placeholder, and adjusting respective sizes of a first cell region and a second cell region based on the logical block address locations, wherein the first cell region and the second cell region are included in non-volatile storage media, the first cell region has a first number of levels, and the second cell region has a second number of levels that is different from the first number of levels.

16. The method of claim 15, further comprising:

enabling a feature for user configuration of a size of the first cell region in response to a command.

17. The method of claim 16, further comprising:

reserving a range of logical block addresses for management of conversions of capacity between the first cell region and the second cell region.

18. The method of claim 16, further comprising:

preserving user data on the non-volatile storage media when the feature is enabled.

19. The method of claim 18, further comprising:

converting a block of the second cell region into a block of the first cell region.

20. The method of claim 19, further comprising:

moving data from the second cell region into the converted block of the first cell region.

\* \* \* \* \*